United States Patent [19]

Kitajima et al.

[11] Patent Number: 4,506,965
[45] Date of Patent: Mar. 26, 1985

[54] MOTOR-DRIVEN WINDING AND REWINDING CAMERA

[75] Inventors: Tomoya Kitajima, Kawasaki; Kunihiko Araki, Tokyo, both of Japan

[73] Assignee: Ricoh Company, Ltd., Tokyo, Japan

[21] Appl. No.: 468,393

[22] Filed: Feb. 22, 1983

[30] Foreign Application Priority Data

| Feb. 22, 1982 [JP] | Japan | 57-27195 |
| Feb. 23, 1982 [JP] | Japan | 57-27800 |
| Feb. 25, 1982 [JP] | Japan | 57-29575 |
| Feb. 25, 1982 [JP] | Japan | 57-29576 |
| Feb. 25, 1982 [JP] | Japan | 57-29577 |
| Feb. 25, 1982 [JP] | Japan | 57-29578 |

[51] Int. Cl.³ .............................................. G03B 1/18
[52] U.S. Cl. .................................... 354/173.1; 354/214
[58] Field of Search ........................... 354/173.1, 214

[56] References Cited

U.S. PATENT DOCUMENTS

| 4,171,893 | 10/1979 | Kawazoe | 354/214 |
| 4,350,421 | 9/1982 | Veda et al. | 354/214 |
| 4,371,244 | 2/1983 | Daitoku et al. | 354/173.1 |
| 4,373,795 | 2/1983 | Kimura et al. | 354/173.1 |
| 4,379,629 | 4/1983 | Daitoku | 354/214 |
| 4,419,001 | 12/1983 | Tominaga et al. | 354/214 |

*Primary Examiner*—Russell E. Adams
*Attorney, Agent, or Firm*—Oblon, Fisher, Spivak, McClelland & Maier

[57] ABSTRACT

A photographic camera which is fully automated in the film winding and rewinding operations is provided. In one form of the present camera, the film winding operation may be automatically moved into the film rewinding operation by detecting the end of the film, for example, by detecting the fact that the tension of the film has exceeded a predetermined level. In another form, a planet gear mechanism is provided in the power transmission train so as to minimize the consumption of energy. In a further form, the camera is provided with an automatic film loading or setting mechanism and an alarm unit for generating an alarm signal when the failure of automatic film setting has been detected. In a still further form, the camera may be operated without film loaded in the camera.

18 Claims, 21 Drawing Figures

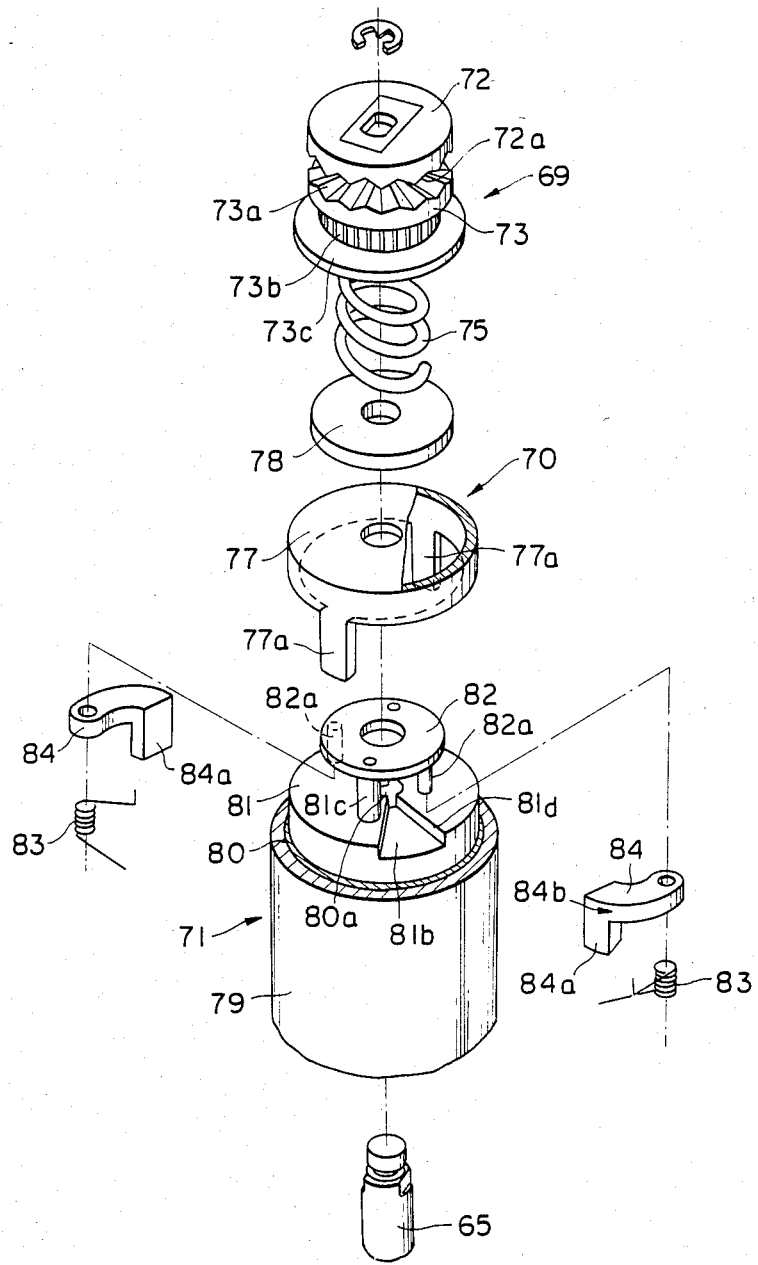

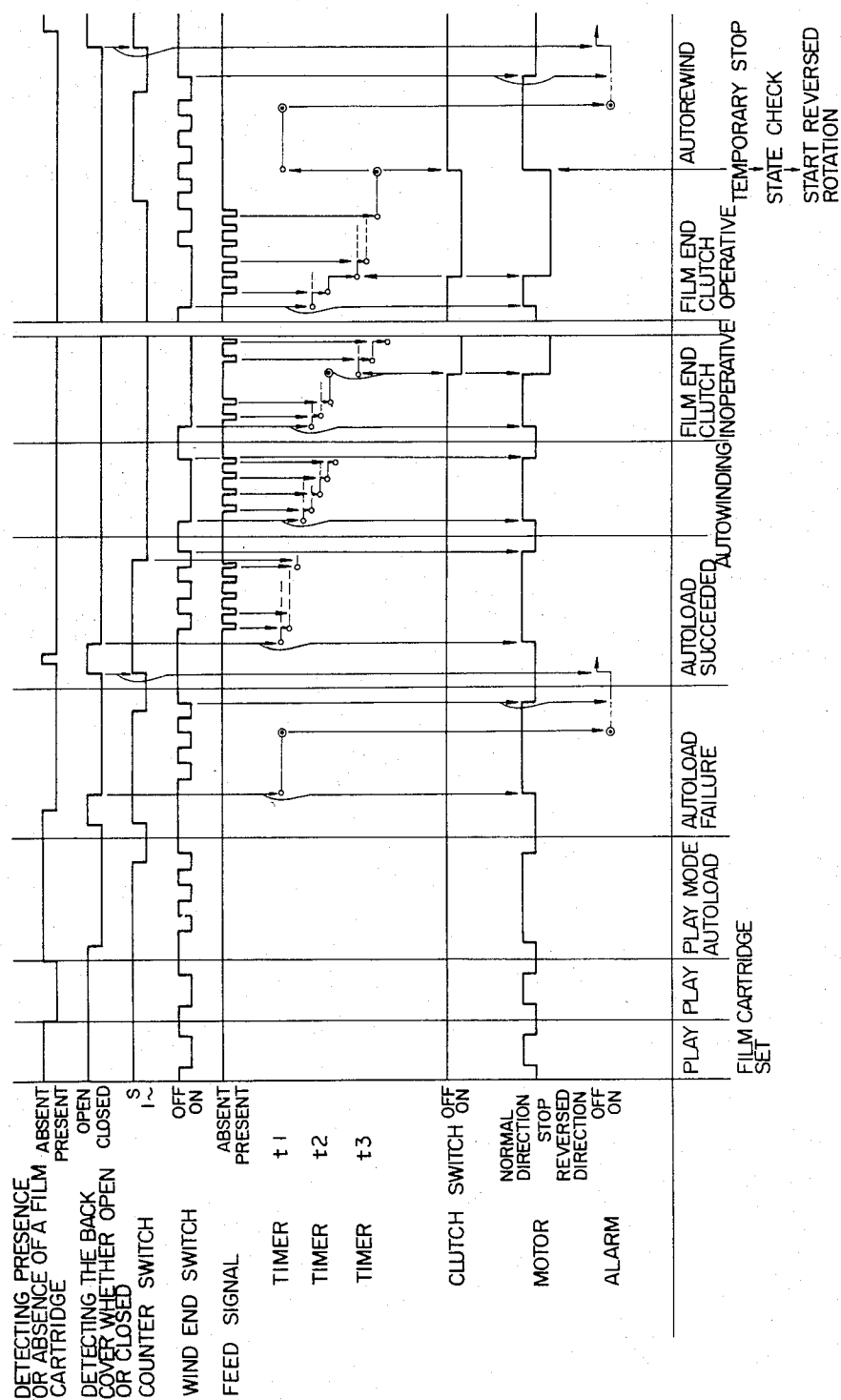

4,506,965

MOTOR-DRIVEN WINDING AND REWINDING CAMERA

BACKGROUND OF THE INVENTION

1. Field of the Invention

This invention generally relates to a photographic camera, and, in particular, to an electrically powered film feeding type camera. More specifically, the present invention relates to a photographic camera in which the winding of film to a spool and the rewinding of the film from the spool are automatically carried out by driving to rotate an electric motor in the normal direction and in the reversed direction, respectively.

2. Description of the Prior Art

A motor-driven film feeding camera in which the winding of film to a spool and the rewinding of the film from the spool are carried out by the normal rotation and the reversed rotation of an electric motor, respectively, is known in the art.

In such a prior art motor-driven film feeding camera, individual winding and rewinding operations of film are automated; however, a manual operation is sill required to initiate the motor-driven rewinding operation after the entire length of the film has been wound. One of such a manual operation is to disconnect the sprocket and the spool from the driving system during rewinding operation and at the same time to connect the rewinding system to the driving system. In other words, when the film is to be rewound into a film cartridge, the operator has to manually disconnect the driving system from the spool in the prior art. Accordingly, the accordance with the prior art, although each of the winding and rewinding operations of the film is automated, the entire film advancing operation is not fully automated, so that there is still a lack of convenience in using cameras.

When it is desired to carry out the film rewinding operation without requiring the manual shifting in the mechanical structure, it may be so structured that the film winding operation is carried out by causing an electric motor to be driven to rotate in the normal direction and the film rewinding operation is carried out by causing the motor to be driven to rotate in the reversed direction. Under the condition, in the case where the winding operation is to be carried out with a rewind fork engaged with the shaft of a film cartridge, when the film is wound to the spool by the sprocket, no problem will be created as long as the rotating speed of the shaft of the film cartridge, which rotates to unwind the film from the shaft, and the rotating speed of the rewind fork, which is driven to rotate, are the same. However, the film stored in a film cartridge is sometimes loosely wound around the shaft of the cartridge and sometimes tightly. Moreover, the length of the film unwound from the cartridge shaft when it makes one revolution varies consistently; whereas, the length of the film advanced by the sprocket per unit time stays constant as long as the sprocket is driven to rotate at constant speed.

Under these circumstances, several disadvantages are expected to be encountered as will be described below.

(1) In the case where the rotating speed $V_1$ of the cartridge shaft transmitted by the sprocket via the film is larger than the rotating speed $V_2$ of the cartridge shaft transmitted by the rewind fork. In this case, the slack of the film inside of the cartridge is gradually taken up, and eventually the film is set under tension between the sprocket and the cartridge shaft whereby the film could be torn away in the worst case.

(2) In the opposite case of the above case (1). This is the case where $V_1$ is smaller than $V_2$. In this case, the slack of the film inside of a film cartridge is increased, so that the film comes to be pressed against the inner wall of the cartridge. In the end, the cartridge shaft starts to wind the film in the reversed direction from its trailing edge which is fixed to the cartridge shaft. If this happens, that portion of the film wound around the cartridge shaft in the reversed direction can no longer be wound to the spool.

In order to avoid the above-mentioned defects, the power transmission relation between the cartridge shaft and the rewind fork may be disconnected. For example, a one-way clutch may be provided in the rewind power transmission system including the rewind fork. However, this is effective only when the rewind power transmission system is designed to satisfy the condition that $V_1$ remains smaller than $V_2$ during the time period from the initiation of the film winding operation till the completion of winding of the entire film length, and, thus, it is limited in structure. On the other hand, in the case of rewinding operation, it is necessary either to disconnect the sprocket completely from the driving system or to provide a friction mechanism to absorb the velociy difference of $V_2-V_1$, which could cause complication in terms of structure required or energy loss due to friction. Another approach would be to provide the rewind fork such that it may be engaged with or disengaged from the shaft of a film cartridge, whereby the rewind fork is to be engaged with the cartridge shaft only when the film is to be rewound into the cartridge. In this case, however, since the rewind power transmission system is also driven at the time of winding operation, this will present other disadvantages such as increased energy consumption.

In a motor-driven winding and rewinding camera, it is usually so structured that the loading or setting of film is automatically carried out by closing the back cover of the camera after positioning the leading portion of the film at a predetermined position. However, it happens often times that the film is not set as expected for various reasons. For example, the operator may fail to position the leading portion of the film correctly. Thus prior art cameras are disadvantageous because no measure is taken against improperly loading the film. Another disadvantage of such prior art cameras is that the motor-driven film winding and rewinding operations may be carried out only when film is loaded in the camera.

SUMMARY OF THE INVENTION

In accordance with one aspect of the present invention, there is provided a fully automated camera in which film winding and rewinding operations can be carried out without requiring any manual operation. That is, a one-way coupling mechanism is provided between the winding shaft of the camera and the spool such that the one-way coupling mechanism allows transmission of the driving power from the winding shaft to the spool during winding operation, but disconnects the driving relation between the winding shaft and the spool during rewinding operation. With this structure, since the power transmission relation between the winding shaft and the spool is automatically disconnected by the one-way coupling mechanism when the spool starts to be driven to rotate to carry out the film rewinding operation, no manual operation is required to initiate the film rewinding operation.

In accordance with another aspect of the present invention, there is provided a fully automated film winding and rewinding camera comprising a constant torque clutch mechanism which is operated to disconnect the transmission of the driving power of the winding shaft to the film when the tension of the film has exceeded a predetermined level, a clutch switch which is operated in association with the operation of the clutch mechanism and a control circuit in response to a signal from the clutch switch for driving to rotate the motor in the reversed direction until the rewind end is reached. With such structure, when the tension of the film at the final stage of winding operation has been increased to a predetermined level which is still below the level of causing damage to the perforations of the film, the clutch mechanism is actuated to supply a wind end signal, and in response to this signal the motor is driven to rotate in the reverse direction to carry out the film rewinding operation. Alternatively, provision may be made of a manually operable switch button which may operate the clutch switch independently from the constant torque clutch mechanism. In this case, the film rewinding operation may be initiated at a desired time even before the film end is reached. Since there is provided the control circuit for keeping the motor in the reversed rotation until the rewind end is reached, once the manually operable switch button is depressed, the rewinding operation can be carried out automatically. In other words, the button need not be continuously depressed.

In accordance with a further aspect of the present invention, there is provided a motor-driven winding and rewinding camera free of reversed winding and tensioning of the film and unnecessary energy consumption. That is, a planet gear mechanism is provided between a driving power transmission system including an electric motor and a rewind power transmission system including a rewind fork, and the planet gear mechanism couples both of the power transmission systems at the time of rewinding operation and decouples them at the time of winding operation. With this structure, since the rewind power transmission system including the rewind fork is decoupled from the driving power transmission system during film winding operation, the disadvantages of reversed winding and tensioning of the film are obviated. If the rewind fork is so provided to be engageable with and disengageable from the shaft of the film cartridge, the energy loss during winding operation may be minimized.

In accordance with a still further aspect of the present invention, there is provided a motor-driven winding and rewinding camera having a simpler structure and yet an enhanced performance in film feeding operation. That is, denoting the total number of rotations required for a sprocekt to wind up the entire film by $n_1$, the total number of rotations required for a rewind fork to rewind the entire film by $n_2$, and the ratio of the number of rotations between the sprocket and the rewind fork by $N_1:N_2$, then the wind and rewind power transmission systems are constructed to satisfy the relation of $N_1/N_2$ being equal to or larger than $n_1/n_2$. When so structured, during the early stage of the film rewinding operation, the film is fed into the cartridge as advanced by the sprocket and the winding function of the cartridge shaft which is driven to rotate by the rewind fork, whereby the film is loosely wound around the cartridge film extremely because the film roll has a relatively smaller diameter. On the other hand, during the final stage of the film rewinding operation in which the film roll has a relatively larger diameter, the film wound around the cartridge shaft becomes increasingly tightened. And, when the sprocket has completed the feeding of the film, there is formed a roll of film tightly wound around the cartridge shaft.

In accordance with a still further aspect of the present invention, there is provided a motor-driven winding and rewinding camera capable of warning the occurrence of failure of automatic of warning the occurrence of failure of automatic film loading operation. That is, in accordance with the present invention, when it is detected that automatic film loading operation has failed, the motor for driving to move the film is stopped and/or a warning signal to the operator is generated. When it is so structured to stop only the motor upon detection of failure of automatic film loading, the number of possible faulty photographic operations may be minimized to a single one because the stoppage of the motor prevents the resetting operation of the shutter and quick return mechanism from taking place. When it is so structured to give a warning signal to the operator, such number may be reduced to zero. If desired, it may also be so structured to stop the motor and/or give a warning signal when the rewind end is reached.

In accordance with a still further aspect of the present invention, there is provided a motor-driven winding and rewinding camera capable of carrying out the winding and rewinding operations without film. This is advantageous because the function of the camera can be throughly examined.

Therefore, it is a primary object of the present invention to provide an improved photographic camera.

Another object of the present invention is to provide a fully automated motor-driven camera which is increased in convenience of operation.

A further object of the present invention is to provide a motor-driven winding and rewinding camera capable of initiating the rewinding operation fully automatically without requiring any manual operation.

A still further object of the present invention is to provide a motor-driven winding and rewinding camera which is reliable in photographic operation and well guarded against faulty photographic operations.

A still further object of the present invention is to provide a motor-driven winding and rewinding camera which may be made rather compact in size despite the increased level of automation in operation.

Other objects, advantages and novel features of the present invention will become apparent from the following detailed description of the invention when considered in conjunction with the accompanying drawings.

BRIEF DESCRIPTION OF THE DRAWINGS

FIG. 11 is a perspective, exploded view showing the constant torque clutch mechanism, spool friction mechanism and one-way coupling mechanism provided between the film winding shaft and the spool;

FIG. 18 is a flow chart useful for understanding the operation of the circuit diagram of FIGS. 17(a) and 17(b)

DETAILED DESCRIPTION OF THE PREFERRED EMBODIMENTS

Figure 1:
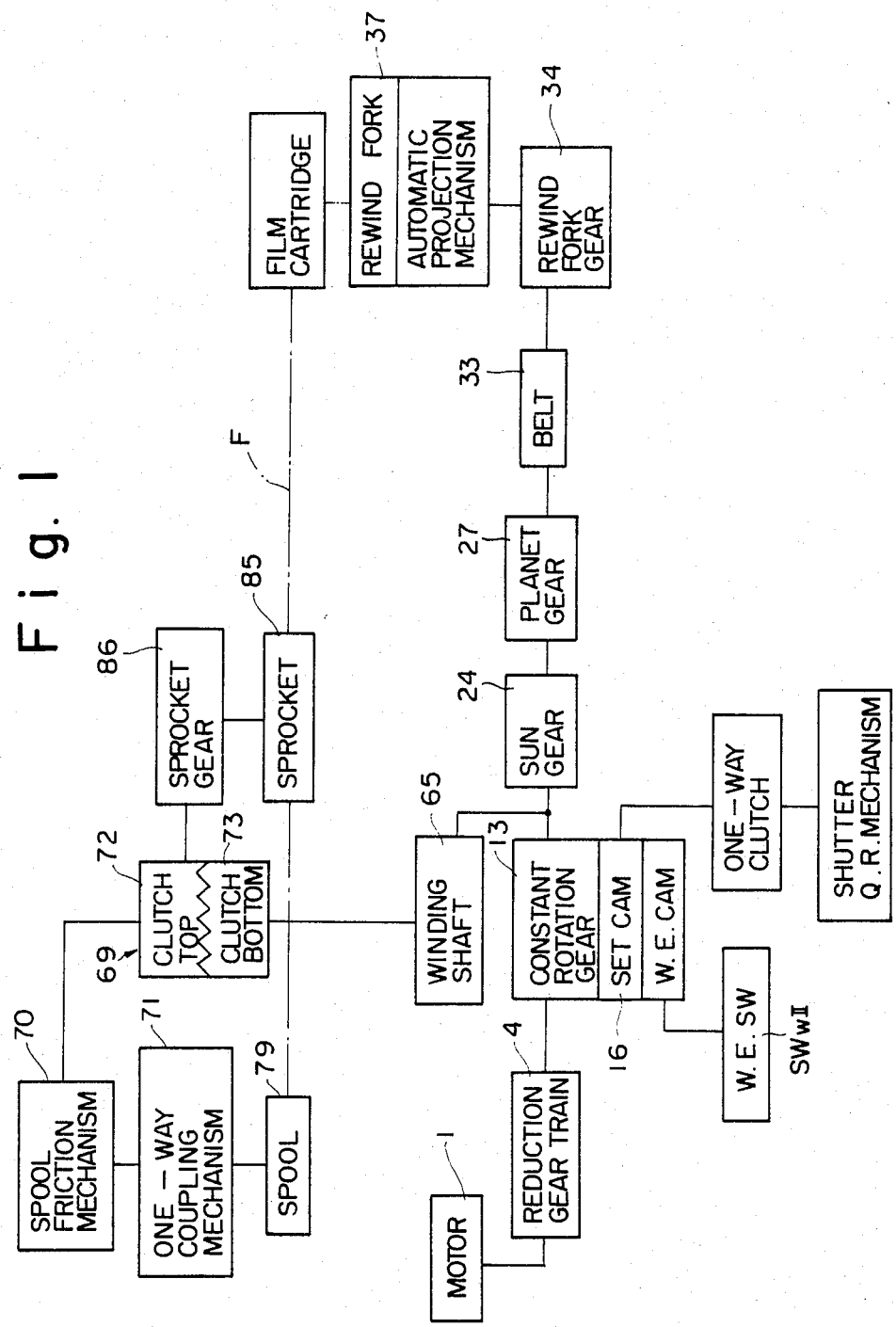
FIG. 1 is a block diagram showing the overall structure of the motor-driven winding and rewinding camera constructed in accordance with one embodiment of the present invention.
Figure 2:
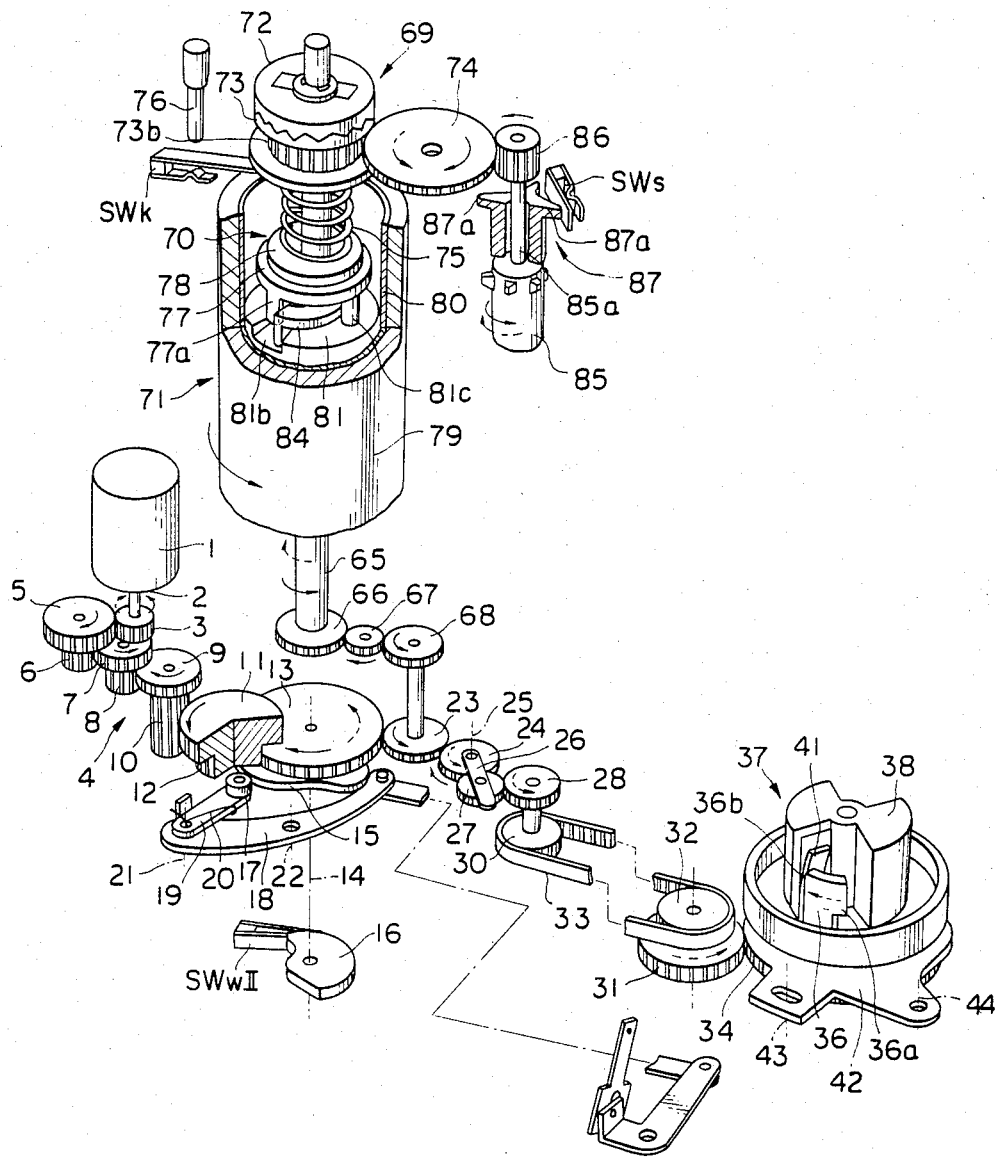
FIG. 2 is a perspective, fragmentary cut-away view showing the main power transmission train of the motor-driven winding and rewinding camera constructed in accordance with one embodiment of the present invention.

Referring now to the drawings, as shown in FIGS. 1 and 2, there is provided a motor 1 which is driven to rotate in the removal direction during winding operation and in the reverse direction during rewinding operation, and the motor 1 has an output shaft 2 to which is fixedly mounted a gear 3 which, in turn, is in mesh with a gear 5 forming a part of a reduction gear train 4. The reduction gear train 4 includes a train of gears 5 through 12, and the gear 12 is meshed with a constant speed rotation gear 13. The gear 13 is fixedly mounted on a shaft 14 on which is supported substantially integrally a set cam 15 as well as a wind end cam 16. The set cam 15 is provided to carry out the set operation of the shutter and quick return mechanism (not shown). In contact with the peripheral cam surface of the set cam 15 is a cam follower 17 which is supported at the free end of a lever 19 which, in turn, is pivoted to one end of the set lever 18. The lever 19 is biased in the counterclockwise direction around a pivot 21 by a spring 20.

When the gear 13 rotates in the winding direction as indicated by the solid line arrow, the set cam 15 also rotates in the same direction thereby causing pivoting of the set lever around the pivot 22 through the cam follower 17 and the lever 19. The other end of the set lever 18 is connected to the shutter and quick return mechanism (not shown) through a link mechanism for carrying out the set operation of these elements. When the gear 13 rotates in the rewinding direction as indicated by the dotted line arrow, the set cam also rotates in the same direction thereby causing the lever 19 to pivot through the cam follower 17. In this case, however, the set lever 18 is not pivoted. If a one-way clutch (not shown) is provided between the shaft 14 and the set cam 15, the cam 15 may be directly engaged with the set lever 18.

The wind end cam 16 is provided to turn a wind end switch $SW_{WII}$ on and off. As shown in FIG. 17, the wind end switch includes the above switch $SW_{WII}$ and the other switch $SW_{WI}$, operated in association with the movement of the second shutter screen (not shown), which are connected in parallel. The photographic operation proceeds as follows: (1) release operation; (2) shutter movement; (3) wind end switch $SW_{WI}$ on; (4) wind end switch $SW_{WII}$ on; (5) wind end switch $SW_{WI}$ off; (6) wind end switch $SW_{WII}$ off.

Figure 3A:
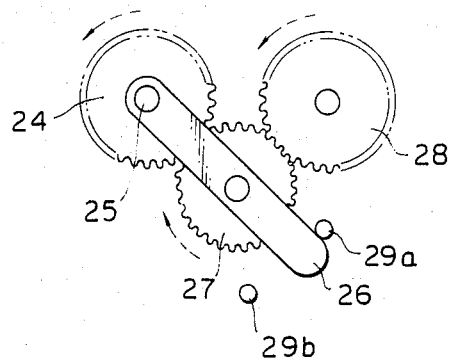
FIGS. 3(a) and 3(b) are schematic illustrations showing the planet gear mechanism used in the structure of FIG. 2.

The constant rotational speed gear 13 is in mesh with a gear 23. In the present specification, the power transmission system or gear train from the motor 1 to the constant rotational speed gear 13 (to the gear 23 in the illustrated embodiment) is named as a driving gear train or driving power transmission system. The gear 23 is in mesh with a sun gear 24 which is rotatably supported on a shaft 25. An arm 26 is rotatably mounted on the shaft 25, and the arm 26 rotatably supports a planet gear 27 which is in mesh with the sun gear 24. As shown in FIG. 3(a), the planet gear 27 is brought into mesh with a rewind driven gear 28 when the sun gear 24 rotates in the rewinding direction as indicated by the dotted line arrow. Under this condition, the arm 26 comes into engagement with a stopper 29a. On the other hand, when the sun gear 24 rotates in the winding direction as indicated by the solid line arrow, the arm 26 is pivoted to engage with the other stopper 29b, so that the planet gear 27 is disengaged from the rewind driven gear 28.

Figure 4:
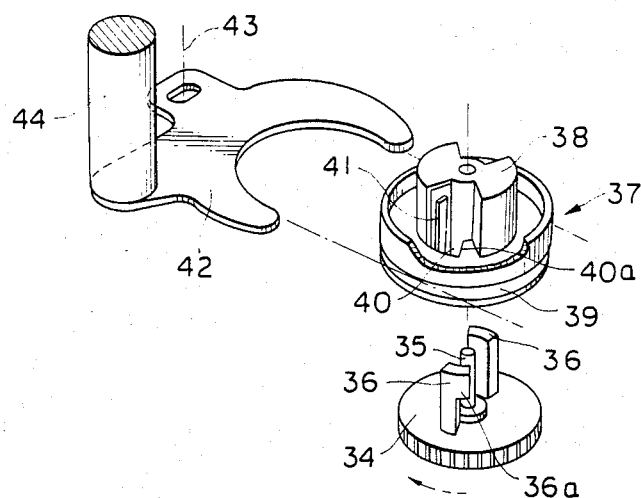
FIG. 4 is a perspective, exploded view showing in detail the rewind fork mechanism used in the structure of FIG. 2.

A pulley is provided integrally and coaxially with the rewind driven gear 28, and, similarly, another pulley 32 is provided integrally and coaxially with a gear 31. An endless belt 33 is extended between the pulleys 30 and 32. The gear 31 is in mesh with a rewind fork gear 34. As best shown in FIG. 4, the rewind fork gear 34 is rotatably supported by a rewind fork shaft fixedly planted in the body of the camera. The rewind fork gear 34 is provided with a pair of engaging pawls 36, 36, and a pawl portion 36a is formed on the pawl 36. A rewind fork 37 is provided with a center hole into which the rewind fork shaft 35 is loosely fitted, and thus the rewind fork 37 is rotatably supported. The rewind fork 37 is provided with a fork portion 38, which is inserted into a film cartridge (not shown) during film rewinding operation, a circumferential groove 39 and a pair of engaging holes 40, 40 (only one of them is shown in FIG. 4) into which the engaging pawls 36, 36 are fitted. The rewind fork 37 is rotatably supported around the rewind fork shaft 35 with the engaging pawls 36, 36 fitted into the engaging holes 40, 40; however, its rotation is limited to a predetermined angle due to the engagement between the engaging pawl 36 and the engaging hole 40. In the present specification, the gear train or power transmission system from the rewind driven gear 28 to the rewind fork 37 is named as a rewind gear train or rewind power transmission system.

A rewind fork spring 41 is provided with its base end fixedly attached to the fork portion 38 and abuts against the back portion 36b of the engaging pawl 36. Because of this spring 41, the rewind fork 37 and the rewind fork gear 34 are biased from each other such that the pawl portion 36a abuts the engaging edge portion 40a (FIG. 4) of the engaging hole 40. As will be fully described later, the pawl portion 36a and the engaging edge portion 40a are brought into or out of engagement. Into the circumferential groove 39 of the rewind fork 37 is loosely fitted an arm portion of a rewind fork actuator plate 42, which is an element for pressing the rewind fork 37 downward and is provided to be vertically movable without rotation as guided by a guide shaft 43 fixedly attached to the body of the camera. One end of a rewind fork actuator rod 44 is fixedly connected to the actuator plate 42.

Figure 5:
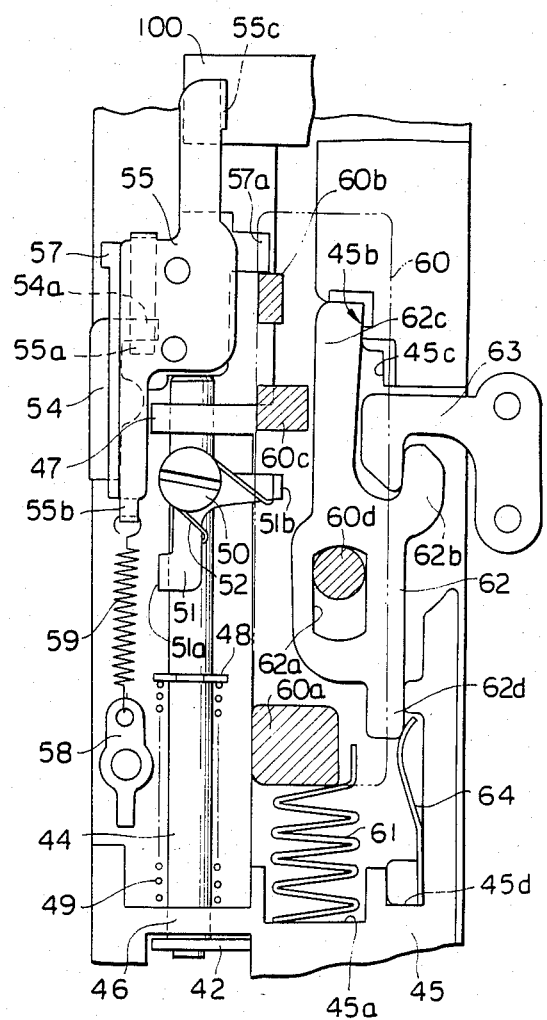
FIG. 5 is a front view showing one state of the back cover lock mechanism and its surrounding structure of the present camera.

As shown in FIG. 5, the rewind fork actuator rod 44 is supported to move up and down by guide portions 46 and 47 which are fixedly provided on the body 45 of the camera. The actuator rod 44 is fixedly provided a spring stopper 48, and a coil spring 49 is extended between the stopper 48 and the guide portion 46, so that the actuator rod 44 is resiliently biased upward. As a result, the rewind fork 37 is so biased to project its fork portion 38 into a film cartridge receiving chamber (not shown) of the camera body by means of the spring 49.

As shown in FIG. 5, the actuator rod 44 is provided with a stepped screw 50 which supports a relief lever 51 rotatably, and the relief lever 51 is biased to rotate in the counterclockwise direction by means of a spring 52. Because of this spring bias, the forward end 51a of the relief lever 51 is pressed against the actuator rod 44. It is to be noted that the spring force of the spring 52 is set so as to be substantially great so that when an external force is applied to the end 51b of the relief lever 51 in the downward direction, the rod 44 will move downward against the force of the spring 49, and the relief lever 51 will start to rotate around the screw 50 only when the downward movement of the rod 44 is restricted by engagement with a fixedly provided element.

Figure 7:
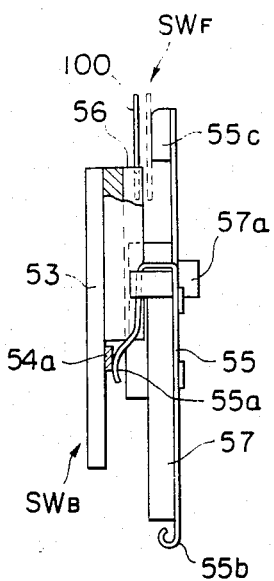
FIG. 7 is a side elevational view showing one state of the back cover switch $SW_B$ used in the present embodiment.

As shown in FIG. 7, on the body 45 is fixedly mounted a stationary contact 54 through an insulating member 53. The stationary contact 54 has one end 54a to which the bent end 55a of a movable contact 55 is opposed, and the bent end 55a of the movable contact 55 may be brought into or out of contact with the end 54a of the stationary contact 54. The movable contact 55 is fixedly mounted on a sliding member 57 which is slidable as guided by a guide groove 56 formed in the body 45 of the camera, as shown in FIG. 7. Between the bottom end 55b of the movable contact 55 and a terminal 58 fixedly provided on the camera body 45 is extended an electrically conductive spring 59, which normally biases the movable contact 55 to move away and thus to be disconnected from the stationary contact 54. The condition shown in FIGS. 5 and 7 indicates that the stationary contact 54 and the movable contact 55 are in contact. It is to be noted that these stationary and movable contacts 54 and 55 constitute a back cover switch $SW_B$.

In FIG. 5, the numeral 60 indicates a back cover button which is to be used for opening and closing the back cover of the camera and which is provided to be slidable vertically. The back cover button 60 is provided with several projections 60a, 60b, 60c and 60d. As shown in FIG. 5, a spring for pushing the button 60 upward is provided with one end thereof fitted into a recess 45a provided in the body 45 and the other end abutted against the projection 60a. It is to be noted that the spring 61 is so selected to have a much stronger spring force as compared with the spring 59. The sliding member 57 on which the movable contact 55 is fixedly mounted has an engaging protrusion 57a which is engaged with the projection 60b. Below the projection 60c is located the end 51b of the relief lever 51 to be engageable therewith.

The remaining projection 60d is fitted in a slot 62a provided in a back cover lock member 62. The lock member 62 is formed with a detent pawl 62b which is engageable with a back cover hook 63 fixedly provided on a back cover (not shown) of the camera and an engaging portion 62c which is selectively engageable with engaging steps 45b and 45c provided in the body 45. The back cover lock member 62 is slidable with respect to the camera body 45 and may pivot around the projection 60d. The back cover lock member 62 has its bottom end 62d abutted against the free end of a leaf spring 64 whose base end is fixedly fitted into a recess 45d of the body 45, so that the back cover lock member 62 is normally biased to rotate in the clockwise direction.

Figure 9:
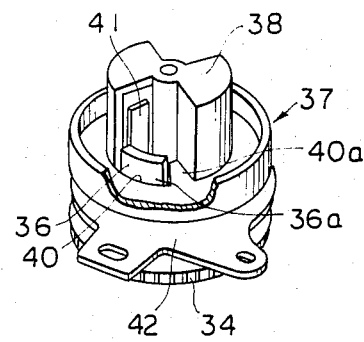
FIG. 9 is a perspective view showing the rewind fork when it is located at the projected position.
Figure 10:
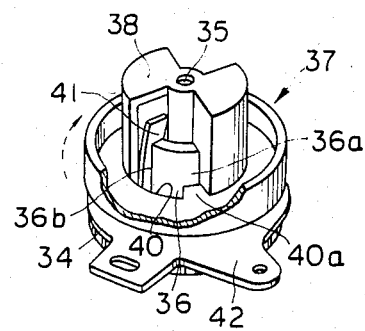
FIG. 10 is a perspective view showing the rewind fork when it is located at the retracted or stand-by position.

FIG. 5 illustrates the condition in which the back cover is locked. Under the condition, the back cover lock member 62 has its engaging portion 62c engaged with the engaging step 45b under the spring action of the spring 61. On the other hand, as shown in FIG. 7, the movable contact 55 keeps in contact with the stationary contact 54 as pushed upward by the projection 60b thereby keeping the back cover switch $SW_B$ closed. The rewind fork actuator rod 44 causes the rewind fork 37 to be projected upward under the force of the spring 49, as shown in FIG. 9. When the actuator rod 44 is pressed downward, the rewind fork 37 is held at the lowered or stand-by position, as shown in FIG. 10. When the actuator rod 44 is pressed downward, the actuator plate 42 which is integral with the rod 44 causes the rewind fork 37 to move downward. Since the rewind fork spring 41 is resiliently abutted against the back portion 36b of the engaging pawl 36 which is loosely fitted in the engaging hole 40, the rewind fork 37 rotates slightly in the clockwise direction due to the force of the spring 41 so that the engaging end 40a is positioned below the pawl portion 36a. Thereafter, when the pressing force applied to the actuator rod 44 is removed, the pawl portion 36a comes into engagement with the engaging edge 40a due to the force of the spring 49 thereby holding the rewind fork 37 at the stand-by position. It is to be noted that the stand-by position is the position where the rewind fork 37 is moved downward such that it does not engage with the shaft of a film cartridge loaded in the film cartridge receiving chamber defined in the camera body.

Figure 12:
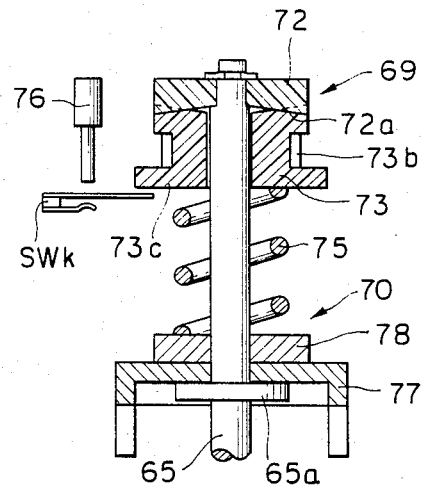
FIG. 12 is a cross sectional view showing on an enlarged scale the main part of the structure shown in FIG. 11.

As shown in FIG. 2, to the bottom of the winding shaft 65 is fixedly mounted a gear 66 which is in mesh with a gear 67, which, in turn, is in mesh with a gear 68 integrally and coaxially provided with the gear 23. As shown in FIGS. 2, 11 and 12, the winding shaft 65 is provided with a constant torque clutch mechanism 69, a spool friction mechanism 70 and a one-way coupling mechanism 71. The constant torque mechanism 69 is provided for preventing the film from being torn away and for detecting the end of film. At the top end of the winding shaft 65 is fixedly mounted a top clutch half 72 having a wave-shaped bottom end face with the ridges running radially. A bottom clutch half 73 is rotatably mounted on the winding shaft 65, and the bottom clutch half 73 has a wave-shaped top end face 73a which is complementary to the wavy bottom end surface 72a of the top clutch half 72. The bottom clutch half 73 is also provided with a toothed portion 73b having wide teeth meshed with an intermediate gear 74 and a spring receiving portion 73c. The bottom clutch half 73 is pressed against the top clutch half 72 by means of a coil spring 75 so that the top and bottom end faces 73a and 72a are in mating contact under pressure. The coil spring 75 is shared by the constant torque clutch mechanism 69 and by the spool friction mechanism 70. Below the spring receiving portion 73c is disposed a clutch switch $SW_K$ which is operated when the bottom clutch half 73 is moved downward. Also provided in the vicinity of the clutch switch $SW_K$ is a rewind button 76, and the clutch switch $SW_K$ may also be turned on by depressing the rewind button 76.

As shown in FIGS. 2, 11 and 12, the winding shaft 65 is provided with a collar 65a (only shown in FIG. 12), and a spool power transmission washer 77 is rotatably mounted on the shaft 65 in pressure contact with the collar 65a under the force of the spring 75 through a spool friction washer 78. The spring 75 and the washers 77 and 78 together form the spool friction mechanism 70, and it has a function to transmit the rotating force of the winding shaft 65 to the spool through friction, as will be more fully described later. The one-way coupling mechanism 71 is disposed between the winding shaft 65 and the spool 79, and it functions to transmit the rotating power to the spool 79 only when the winding shaft 65 rotates in the winding direction. The spool 79 includes a cylinder having a highly frictional peripheral surface and it is formed by rubber and the like integrally with an inner cylinder 80. A follower member 81 is integrally and fixedly fitted into the inner cylinder 80.

Figure 13:
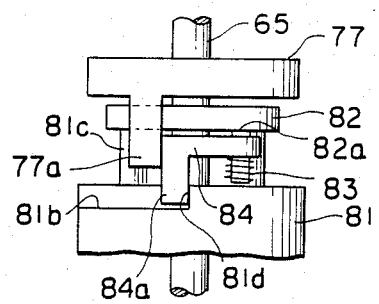
FIG. 13 is a front view showing in detail the one-way coupling mechanism.
Figure 14:
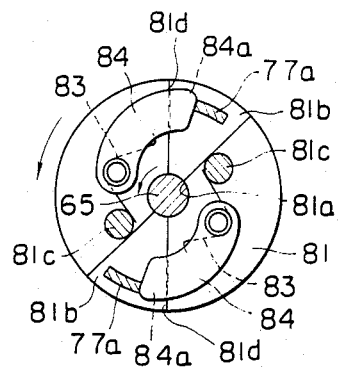
FIG. 14 is a plan view of the one-way coupling mechanism of FIG. 13 during film winding operation.

As shown in FIGS. 11 and 14, the follower member 81 is provided with a center hole 81a through which the winding shaft 65 extends, a pair of engaging recesses 81b, 81b formed on the top end face and arranged opposite to each other with respect to the center hole 81a, a pawl support 82 supported by a pair of poles 81c, 81c, a pair of pawl support pins 82a, 82a depending from the pawl support 82 and a pair of one-way pawls 84, 84, each of which is rotatably supported by the corresponding pin 82a and biased outwardly by means of a relatively weak spring 83. As best shown in FIG. 13, the one-way pawl 84 has an engaging portion 84a which extends into the engaging recess 81b and abuts against the engaging step 81d under the force of the spring 83.

Figure 15:
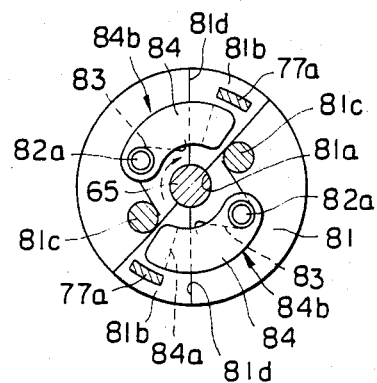
FIG. 15 is a plan view of the one-way coupling mechanism of FIG. 13 during film rewinding operation.
Figure 19:
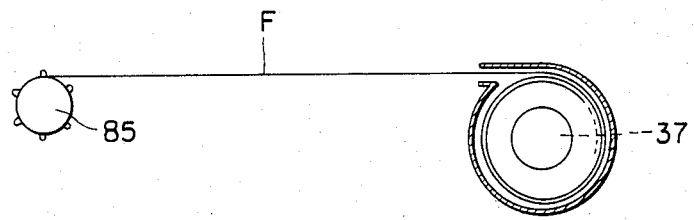
FIG. 19 is a schematic illustration in plan view showing the relation among the sprocket, film and rewind fork of the present camera.

On the other hand, the spool power transmission washer 77 is provided with a pair of power transmitting projections 77a, 77a which extend downward so as to be engageable with the corresponding engaging portions 84a, 84a. As shown in FIG. 14, when the winding shaft 65 rotates in the counterclockwise (winding) direction, the power transmitting projection 77a is rotated in the same direction via the spool friction mechanism 70 to abut against the one-way pawl 84 so that the spool 79 is rotated in the winding direction through the engaging portions 84a and the engaging steps 81d. During film rewinding operation, as shown in FIG. 15, the winding shaft 65 rotates in the clockwise direction and the power transmitting projections 77a rotate in the same direction; in this case, however, the power transmitting projections 77a come to abut the back portions 84b of the one-way pawls 84 thereby causing the pawls 84 to rotate against the force of the springs 83, so that the spool 79 is not driven to rotate. In FIG. 15, the back portions 84b of the one-way pawls 84 and the power transmitting projections 77a are shown slightly spaced apart from each other solely for the purpose of illustration. The one-way coupling mechanism 71 of the illustrated embodiment is comprised of such elements as the spool power transmission washer 77, the follower member 81; however, any other structure may be easily used as long as such an alternative structure allows transmission of the rotating power of the winding shaft 65, when rotated in the winding direction, to the spool 79.

Referring back to FIG. 2, the intermediate gear 74 is in mesh with a sprocket gear 86 which is fixedly mounted on a shaft 85a of a sprocket 85. A film feeding detecting cylinder 87, which is rotated by the side edge of the film, is rotatably fitted onto the shaft 85a. The detecting cylinder 87 is provided with projections 87a arranged on its peripheral surface, and a film feeding signal switch $SW_S$ is disposed to be engageable with the projections 87a of the detecting cylinder 87, so that the switch $SW_S$ is turned on and off as the detecting cylinder 87 rotates due to the advancement of the film. It is so structured that the sprocket 85 receives the rotating force from the constant rotational speed gear 13 so as to advance the film over one frame when the gear 13 makes one turn. In the present specification, the gear train from the gear 23 to the sprocket 86 is referred to as a winding gear train or a winding power transmission system.

It is so structured that the film winding speed of the spool 79 is always greater than the film feeding velocity of the sprocket 85 and the difference in velocity is absorbed by the spool friction mechanism 70 thereby allowing taking up of the film tightly onto the spool 79. During rewinding operation, since the rotational speed of the spool power transmission washer 77 by the winding gear train is larger than the rotational speed of the spool 79 by the film and driving power is not transmitted to the spool 79 by the gear train, as described above, the film to be rewound may be smoothly unwound from the spool 79. In the preferred embodiment, designating the total number of revolutions required for the sprocket 85 to feed the film over its entire length by $n_1$, the total number of revolutions required for the rewind fork 37 to tightly rewind the film over its entire length by $n_2$, and the ratio of number of revolutions of the sprocket to the number of revolutions of the rewind fork by $N_1:N_2$, then the winding and rewinding gear trains are so structured to satisfy the relation of $N_1/N_2$ is equal to or greater than $n_1/n_2$.

Figure 8:
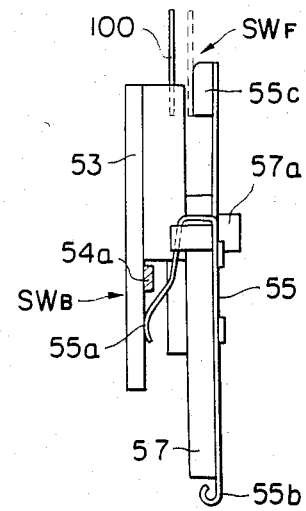
FIG. 8 is a side elevational view showing another state of the back cover switch $SW_B$ shown in FIG. 7.
Figure 17A:
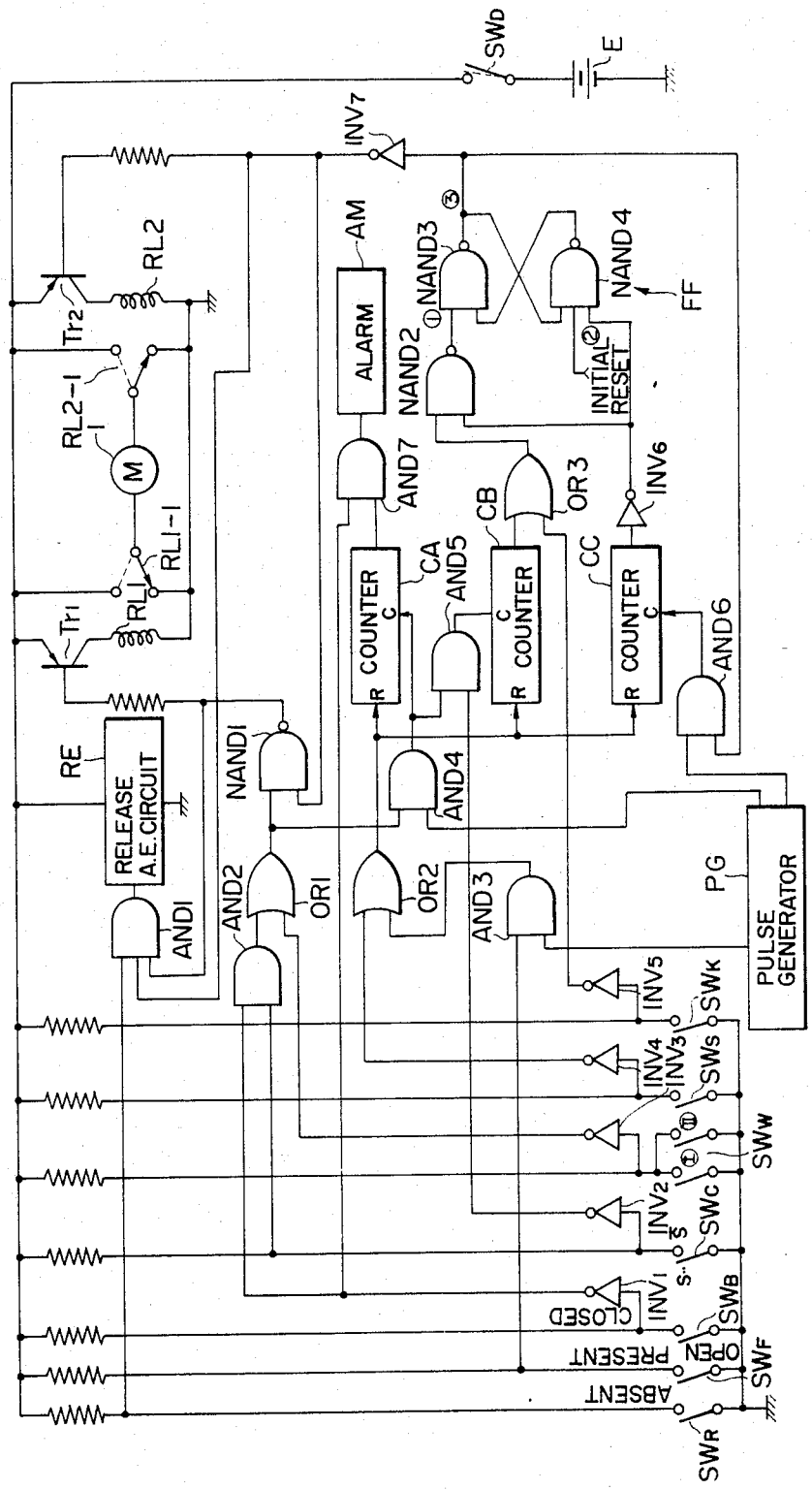
FIG. 17(a) is a circuit diagram partly in blocks and partly in logic symbols showing the control circuit for controlling the operation of the camera constructed in accordance with one embodiment of the present invention.

In the film cartridge receiving chamber is provided a cartridge detecting switch $SW_F$ (FIG. 17(a)) for detecting whether or not a film cartridge is loaded in the chamber. As shown in FIGS. 7 and 8, a movable contact 100 changes its position depending upon whether or not a film cartridge is present in the chamber. That is, in the case of absence of a film cartridge, the movable contact 100 takes the position separated away from the other movable contact 55c as indicated by the solid line; whereas, in the case of the presence of a film cartridge, the movable contact 100 takes the position indicated by the dotted line whereby the contact 100 is in contact with the contact 55c, indicating that the cartridge detecting switch $SW_F$ is closed.

Figure 16:
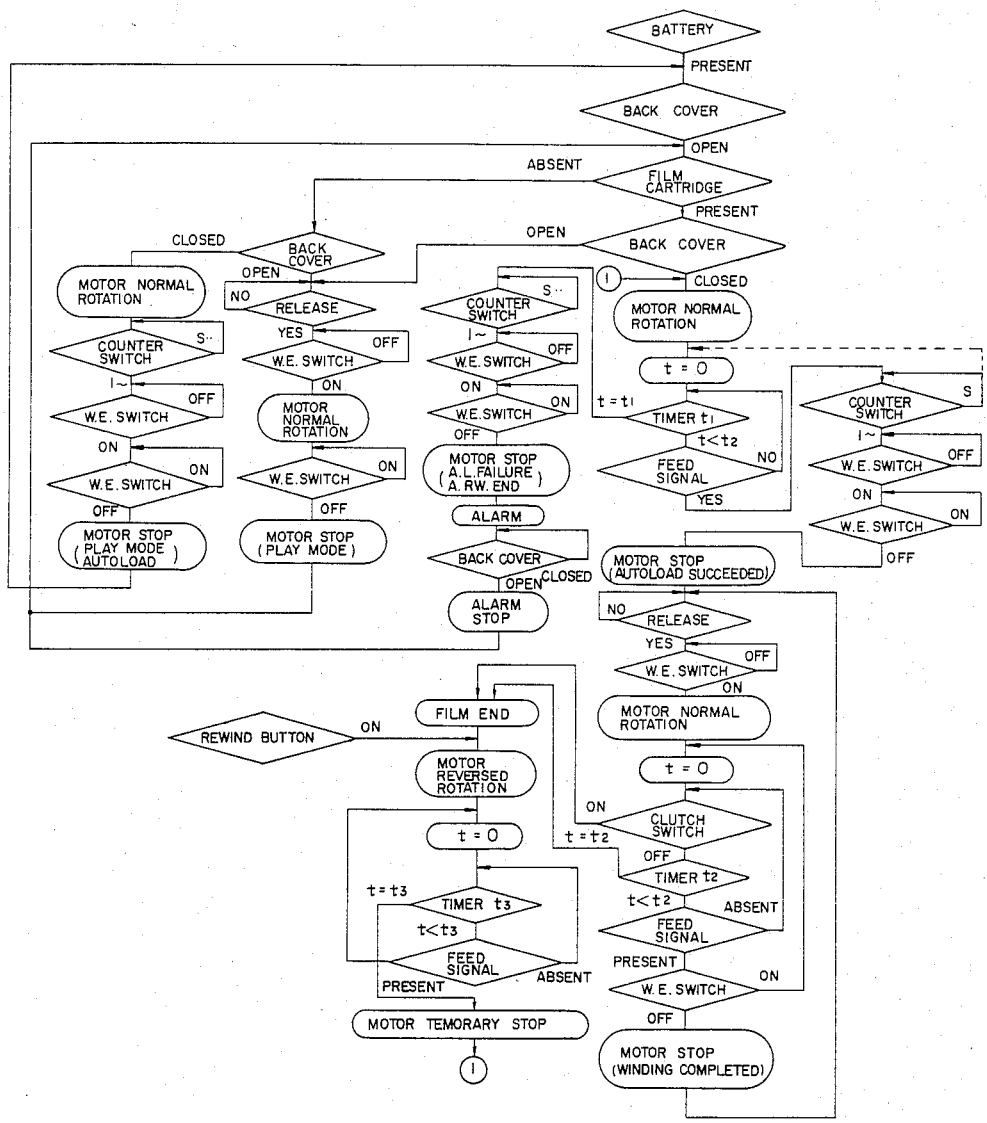
FIG. 16 is a flow chart showing the flow of the motor control operation in accordance with one embodiment of the present invention.
Figure 17B:
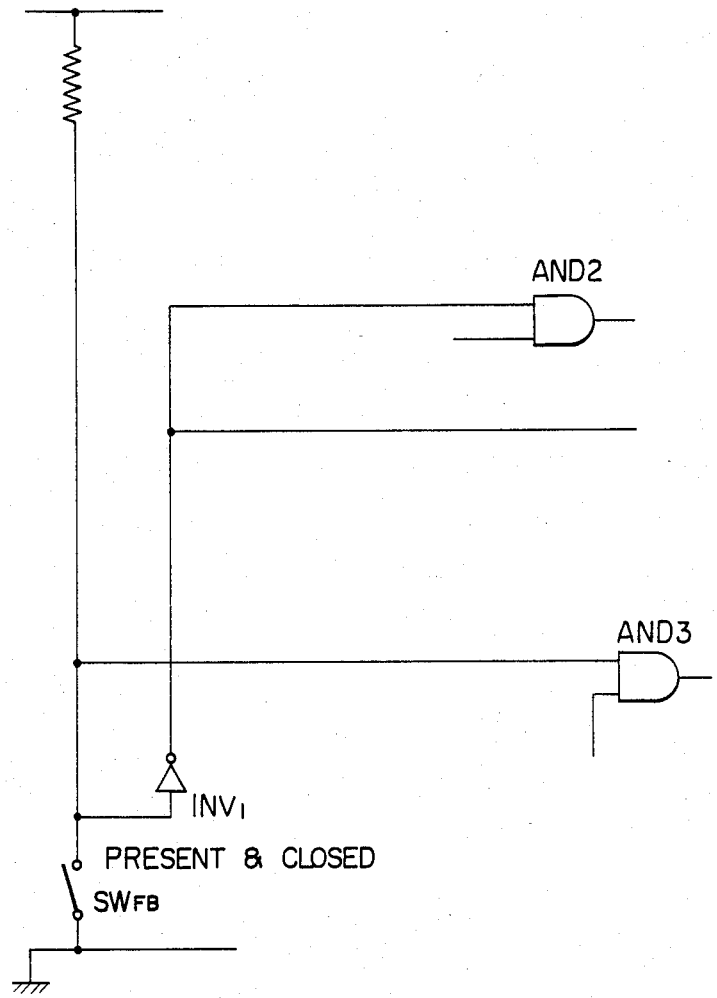
FIG. 17(b) is a circuit diagram showing a modification of the circuit diagram of FIG. 17(a)

By constructing the back cover switch $SW_B$ and the film cartridge detecting switch $SW_F$ as described above, the control system of the present invention as will be described later with reference to FIGS. 16-18 may be established and the following system may also be used. That is, with the movable contact 100 grounded and the stationary contact at a predetermined voltage, a switch $SW_{FB}$ is constructed such that it is turned on only when a film cartridge is present in the film receiving chamber and the back cover is closed. Based on this, the circuit as shown in FIG. 17(b) is constructed. When so structured, the "PLAY MODE AUTOLOAD" operation in FIG. 16 is removed, and, thus, whenever the switch $SW_{FB}$ is off, the play mode autowinding operation is carried out. Otherwise, both of the systems are identical.

Also provided as shown in FIG. 17(a) is a counter switch $SW_C$ which is connected to the sprocket 85 and which increments by +1 as the film is moved over a single frame during winding operation and decrements or is reset to the initial condition (or "S") during rewinding operation. And, the counter switch $SW_C$ detects the two different states of the film counter, i.e., "S . . . " and "1-36", in association with the operation of the film counter which is reset to "S" when the back cover is made open. Moreover, as will be described in detail later, the present camera is provided with an alarm mechanism (FIG. 17) for radiating sound or light in response to a control signal.

Now, the operation of the present camera structured as described above will be described with particular reference to FIGS. 16-18.

FILM LOADING

Figure 6:
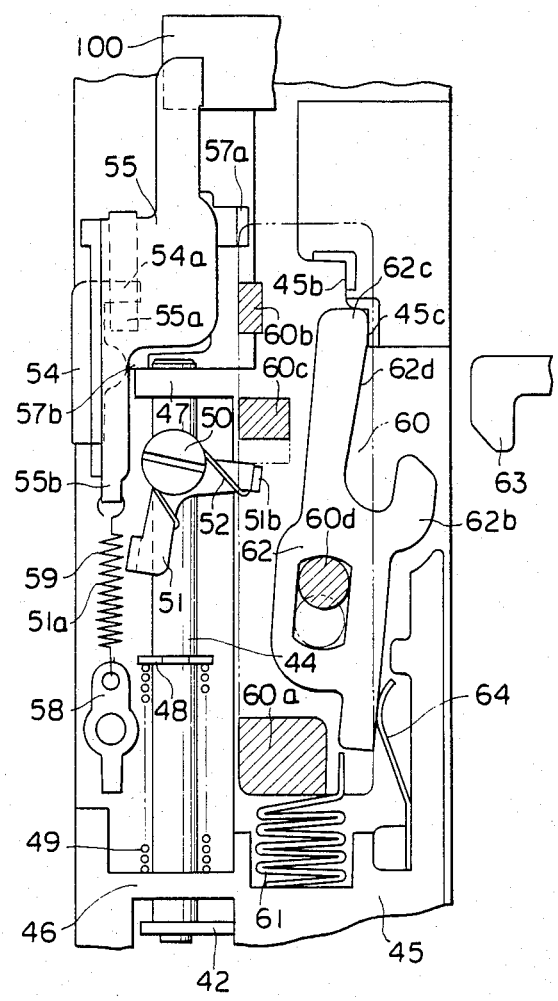
FIG. 6 is a front view showing another state of the structure shown in FIG. 5.

A power switch $SW_D$ is first turned on. When the back cover button 60, shown in FIG. 5, is pushed downward against the force of the spring 61 by fingers, the projection 60d causes the back cover lock member 62 to move downward. Since the back cover lock member 62 is biased to rotate in the clockwise direction by means of the leaf spring 64, when it is pushed downward to the point where the engaging portion 62c is disengaged from the engaging step 45b, it rotates clockwise to bring the engaging portion 62c into engagement with the other engaging step 45c, as shown in FIG. 6. When the back cover lock member 62 is pushed downward, the projection 60d comes into contact with the bottom edge of the slot 62a as indicated by the two dotted line; however, when the pressing action of the back cover button 60 is terminated, the button 60 moves upward under the force of the spring 61 to take the position indicated in FIG. 6. The sliding and pivotal motion of the back cover lock member 62 causes the lock member 62 to be gradually disengaged from a hook member 63 of the back cover. That is, when the projection 60b is moved to the position indicated in FIG. 6 by pressing down the back cover button 60, the movable contact 55 which has kept the back cover switch $SW_B$ closed through engagement with the projection 60b follows the projection 60b under the force of the spring 59, as shown in FIG. 6. However, the relative movement of the back cover switch $SW_B$ is stopped when the stopper portion 57b of the sliding member 57 comes into contact with the guide portion 47.

Under this condition, the bent end 55a of the movable contact 55 and the end 54a of the stationary contact 54 are spaced apart from each other, as shown in FIGS. 6 and 8. This indicates that the back cover switch $SW_B$ is off. Then, when the back cover is made open, the film counter is reset to "S" and the counter switch $SW_C$ is turned off. When the projection 60c moves due to the pressing down operation of the back cover bottom 60, the projection 60c comes into engagement with the end 51b of the relief lever 51, so that the rewind fork actuator rod 44 is moved downward against the force of the spring 49. Even if the actuator rod 44 has reached the bottom dead point, the projection 60c continues to move downward; however, this downward movement of the projection 60c is not transmitted to the actuator rod 44 because the relief lever 51 starts to move pivotally, the hook member 63 of the back cover is completely disengaged from the back cover lock member 62.

When the rewind fork actuator rod 44 is pressed downward, the actuator plate 42 which is integral with the rod 44 presses the rewind fork 37. In the case where the actuator rod 44 is located at the elevated position, the rewind fork 37 projects and the pawl portion 36a of the engaging pawl 36 is located inside of the hole 40, as shown in FIG. 9. Under the condition shown in FIG. 9, when the actuator plate 42 is pushed downward, the rewind fork 37 is lowered in position. Then, immediately before the actuator rod 44 reaching the bottom dead position, the rewind fork 37 is caused to rotate clockwise under the force of the rewind fork spring 41, so that the engaging edge 40a is positioned below the pawl portion 36a, as shown in FIG. 10. Thereafter, when fingers are removed from the back cover button 60, the button 60 moves upwardly by the distance in which the projection 60d moves inside of the slot 62a. Thus the projection 60c and the relief lever 51 remain in contact, and the actuator rod 44 keeps the current position. Moreover, the rewind fork 37 and the engaging pawl 36 remain engaged from each other under the influence of the rewind fork spring 41. Therefore, even if the rewind fork portion is touched by fingers with the back cover kept open, the fork 37 and the engaging pawl 36 return to the engaging position under the force of the spring 41 and its engaging condition is maintained. In other words, the rewind fork 37 is held at the stand-by position. Under the circumstances, since the rewind fork is not projecting into the storing chamber through the bottom of the chamber, a film cartridge may be loaded or unloaded with ease.

AUTOSTART

The back cover is opened to load a film cartridge, and, then, pulling out the leading section of the film from the cartridge approximately to the peripheral surface of the spool 79, the back cover is closed. With the cartridge in position, the movable contact 100 and the contact 55c are in contact, so that the film cartridge detecting switch $SW_F$ (FIG. 17(a)) is closed. In FIG. 6, when the back cover is closed, the hook member 63 abuts against the side edge 62d of the back cover lock member 62, which is thus turned in the counterclockwise direction against the force of the spring 64. With such a movement, the lock member 62 causes its engaging portion 62c disengaged from the engaging step 45c, and then the lock member 62 moves upward under the force of the spring 61. Upward movement of the lock member 62 is restricted when the engaging portion 62c comes into engagement with the engaging step 45b. At this time, the detent pawl 62b also comes into engagement with the hook member 63, as shown in FIG. 5, thereby holding the back cover in the closed position as locked.

The upward movement of the back cover button 60 also causes the projection 60c to move upward; however, the rewind fork 37 is held at the lowered and stand-by position. As the projection 60b moves due to the upward motion of the back cover button 60, the movable contact 55 is moved upward against the force of the spring 59, as shown in FIG. 5, so that the bent end 55a of the movable contact 55 is brought into contact with the end 54a of the stationary contact 54, indicating that the back cover switch $SW_B$ is closed.

As shown in FIG. 17(a), when the back cover switch $SW_B$ is closed, an inverter $INV_1$ supplies Hi (high level signal) at its output. At this juncture, if the film counter indicates "S" and the counter switch $SW_C$ is off, an AND circuit $AND_2$ supplies Hi at its output so that an OR circuit $OR_1$ supplies Hi as its output. Since an inverter $INV_7$ supplies Hi as its output, a NAND circuit $NAND_1$ supplies a low level output (or, simply Lo). As a result, a transistor $Tr_1$ is turned on to have a relay $RL_1$ energized so that its contact $RL_{1-1}$ is changed to the position indicated by the dotted line thereby causing the motor 1 to be driven to rotate in the winding direction (normal direction as indicated by the solid line arrow in FIG. 2). When the motor 1 is driven to rotate, the driving gear train including the reduction gear train 4 and the constant rotational speed gear 13 and the winding gear train are energized so that each of the elements is driven to rotate in the direction indicated by the solid line arrow (FIG. 2) whereby the spool 79 and the sprocket 85 are also driven to rotate to carry out the winding operation of the film until the film counter reaches "1."

When the film counter has reached "1" to locate the first frame at the photographic position, the counter switch $SW_C$ is turned on, which then causes the AND circuit $AND_2$ to supply Lo as its output. This then causes the OR circuit $OR_1$ to supply Lo as its output and thus the NAND circuit $NAND_1$ supplies Hi as its output. As a result, the transistor $Tr_1$ is turned off and the relay $RL_1$ becomes deenergized thereby stopping the rotation of the motor 1 and thus the winding operation of the film. If a certain frame is at the photographic position and the film counter is not "S" when the back cover switch $SW_B$ is closed, the counter switch $SW_C$ remains on from the beginning so that the motor 1 remains undriven and thus no winding operation of the film takes place. Thus the automatic film loading operation (or, simply "autoload") is completed and it is now set ready for carrying out a photographic operation by depressing the release button of the camera.

Figure 3B:
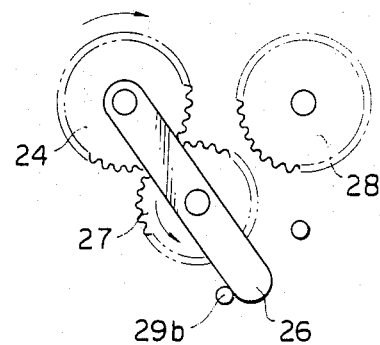

Now, the function of the power transmitting system to the film cartridge of the present camera will be described. As described previously, at the time of loading a film cartridge, the rewind fork 37 is located at the stand-by position. In FIG. 2, the rotation of the motor 1 is transmitted to the sun gear 24 through the driving gear train to cause it to rotate in the direction indicated by the solid line arrow. However, as shown in FIG. 3(b), since the planet gear 27 moves in the direction separating away from the rewind driven gear 28, the gear 28 is not driven to rotate. In other words, provision of the planet gear mechanism allows to disconnect the transmission of driving power to the rewinding gear train which has nothing to do with the winding operation. However, immediately after the initiation of the winding operation, the planet gear 27 is in mesh with the rewind driven gear 28 thereby causing this gear to rotate. On the other hand, the rewind fork gear 34 to be rotated by the sun gear 24 through the planet gear 27, rewind driven gear 28, timing belt 33 and gear 31 remains to be located at the stand-by position because the pawl portion 36a and the engaging edge portion 40a move in the unconstrained direction. The time period in which the planet gear 27 meshes with the rewind driven gear 28 at the time of film winding operation is extremely short.

Therefore, by providing both of the planet gear mechanism and the rewind fork automatic projecting mechanism, consumption of energy at the time of film winding operation may be minimized. With the planet gear mechanism alone, the rewind gear train is driven by the film at the time of film winding operation; on the other hand, with the rewind fork automatic projecting mechanism alone, the rewinding gear train is driven thereby causing an increase of load and loss of energy. Even if the film winding operation is initiated under the abnormal condition, for example, with the rewind fork 37 in the projected state, since the rotational speed $V_3$ at the planet gear 27 caused to be rotated by the rewind driven gear 28 through the film and the rewind fork 37 is smaller than the rotational speed $V_4$ at the planet gear 27 caused to be rotated by the sun gear 24 at the beginning of the film winding opération (i.e., the rewind driven gear 28 stays still with respect to the sun gear 24), the planet gear mechanism functions in the expected manner to disconnect the driving of the rewinding gear train thereby preventing reverse winding and tensioning of the film from taking place.

AUTOSTART (FAILURE)

This is the operation when the engagement of the film to the spool has failed and thus the film has not been wound to the spool. In the case where no film feeding signal has been supplied even if a predetermined time period $t_1$ has elapsed as from the time of initiation of rotation of the motor 1 in the winding direction (i.e., in the case where the film feeding detecting cylinder 87 does not rotate), rotation of the motor 1 is stopped. That is, the film feeding signal switch $SW_S$ is off and the inverter $INV_4$ supplies Lo as its output. In addition, since the film cartridge detecting switch $SW_F$ is on and the AND circuit $AND_3$ supplies Lo as its output, the OR circuit $OR_2$ supplies output Lo. On the other hand, the output from the OR circuit $OR_1$ is Hi and it is supplied as an input to the AND circuit $AND_4$, so that the pulses from the pulse generator PG are passed through the AND circuit $AND_4$ to be counted at the counter CA. Counters CA, CB and CC have predetermined time counts $t_1$, $t_2$ and $t_3$, respectively, and they function as timers. For example, the counter CA supplies Hi as its output after elapsing time period $t_1$ as from the initiation of counting operation. At this time, since the back cover switch $SW_B$ is on and the output from the inverter $INV_1$ is Hi, the AND circuit $AND_7$ supplies Hi as its output thereby causing the alarm AM on to have it generate a warning signal indicating failure of film winding operation. Such a warning signal may be produced by either sound, light or both.

In response to the alarm indicating failure of film winding operation (autoload), when the back cover is opened, the back cover switch $SW_B$ is turned off, which then causes the output of the inverter $INV_1$ to be Lo, and, thus, the AND circuit $AND_7$ supplies Lo as its output, so that the alarm AM is turned off. Then, after reloading or resetting the film to the spool, when the back cover is closed, the above-mentioned autostart sequence is resumed.

AUTOWINDING

After a successful autoload operation, when the release button is depressed, the release switch $SW_R$ is turned on and thus the AND circuit $AND_1$ supplies Hi as its output. Accordingly, the shutter is driven to operate by means of the release A.E. (automatic exposure) circuit RE. Then, upon completion of movement of the shutter second screen, a wind end switch $SW_{WI}$ is turned on, which, in turn, causes the inverter $INV_3$ to supply Hi as its output. Thus, the OR circuit $OR_1$ supplies Hi and the NAND circuit $NAND_1$ supplies Lo, so that the transistor $Tr_1$ is turned on to cause the relay $RL_{1-1}$ energized thereby having the motor 1 driven to rotate in the film winding direction.

Then the constant rotational speed gear 13 (see FIG. 2) completes one turn to reset the shutter and quick return mechanism, and, at the same time, the sprocket 85 is rotated to feed the film over a single frame. Because of this, the wind end switch $SW_W$ is turned off to have the inverter $INV_3$ supply Lo as its output. In this case, since the counter switch $SW_C$ is on, both of the AND circuit $AND_2$ and the OR circuit $OR_1$ supply Lo as their outputs and the NAND circuit $NAND_1$ supplies Hi as its output, so that the transistor $Tr_1$ is turned off thereby causing the motor 1 to stop. Such an autowinding operation is repetitively carried out every time when the release button is depressed until the end of film is detected.

DETECTION OF END OF FILM

As the winding operation of the film proceeds, and when the situation is arrived such that a further winding operation is impossible, i.e., the load torque of the spool 79 has increased to the level which is closer to the level of causing tearing of film, the bottom clutch half 73 is moved downward against the force of the spring 75 in accordance with the particularly shaped mating end surfaces 72a and 73a of the top and bottom clutch halves 72 and 73 thereby causing the driving power transmission line between the film winding shaft 65 and the sprocket 85 to be disconnected (see FIGS. 2, 11 and 12). As shown in FIGS. 2 and 12, such a downward movement of the bottom clutch half 73 causes the clutch switch $SW_K$ to be closed, which, in turn, causes each of the inverter $INV_5$ and the OR circuit $OR_3$ to supply Hi as its output. Since the counter CC supplies Lo and the inverter $INV_6$ supplies Hi, the NAND circuit $NAND_2$ supplies Lo. Thus a flipflop FF comprised of $NAND_3$ and $NAND_4$ is set thereby supplying Hi as its output. This Hi output signal from the flipflop FF is used as an end of film signal.

When the voltage at the voltage source E drops, the clutch mechanism cannot be operated, so that the motor 1 stops even if the wind end switch $SW_W$ is on. Not only in this case, but also in the case where the sprocket has torn the film, an end of film signal is supplied. That is, when the film feeding signal switch $SW_S$ is turned off, the inverter $INV_4$ supplies Lo as its output. Under the condition, since the film cartridge detecting switch $SW_F$ is on and the AND circuit $AND_3$ supplies Lo as its output, the OR circuit $OR_2$ supplied Lo as its output, so that Lo is applied to each of the reset inputs of the counters CA, CB and CC. On the other hand, the OR circuit $OR_1$ supplies Hi as its output, which, in turn, is applied to one input of the AND circuit $AND_4$; moreover, the counter switch $SW_C$ is on and the inverter $INV_2$ supplies Hi as its output. Therefore, pulses supplied from the pulse generator PG are supplied through the AND circuits $AND_4$ and $AND_5$ and counted at the counter CB, and, after elapsing predetermined time period $t_2$ as from the initiation of counting, the counter CB supplies Hi as its output thereby causing the OR circuit $OR_3$ to supply Hi as its output. At this time, since the counter CC supplies Lo as its output and the inverter $INV_6$ supplies Hi as its output, the NAND circuit $NAND_2$ supplies Lo as its output to have the flipflop FF set thereby causing an end of film signal to be supplied as an output.

AUTOREWINDING

When an end of film signal is output, the inverter $INV_7$ supplies Lo as its output so that the transistor $Tr_2$ is turned on thereby causing the relay $RL_2$ to be energized to move the contact $RL_{2-1}$ to the position indicated by the dotted line to have the motor 1 driven to rotate in the rewinding (reversed) direction.

In FIG. 2, when the motor 1 is driven to rotate in the rewinding direction as indicated by the dotted line arrow, the constant rotational speed gear 13 rotates in the rewinding direction, so that the sun gear 24 is driven to rotate in the direction indicated by the dotted line arrow. Such a rotation of the sun gear 24 causes the planet gear 27 to move around the sun gear 24 to be meshed with the rewind driven gear 28, as shown in FIG. 3(a), to cause the gear 28 to be driven to rotate. The rotation of the rewind driven gear 28 is transmitted to the rewind fork gear 34 through the timing belt 33 and the gear 31 thereby causing the gear 34 to rotate in the rewiding direction as indicated by the dotted line arrow (see FIGS. 2 and 10). In FIG. 10, the rewind fork 37 receives the frictional force applied by the actuator plate 42 which is spring-biased against the fork 37 by the actuator rod 44 and the spring 49 (see FIG. 5). Since this frictional force is larger than the pressure force applied by the rewind fork spring 41, the rotation of the rewind fork gear 34 causes the rewind fork spring 41 to bend. As a result, when the rewind fork gear 34 rotates over the angle where the pawl portion 36a is disengaged from the engaging edge portion 40a, the rewind fork 37 is projected by the actuator plate 42 which is biased by the spring 49, as shown in FIG. 9. Such a projection of the rewind fork 37 is restricted by the top dead point of the actuator rod 44 whose range of movement is limited by the body 45. When projected, the rewind fork 37 is inserted into the film cartridge housed in the receiving chamber of the camera body and becomes engaged with the shaft of the cartridge. It is so structured that when the rewind fork 37 is in engagement with the shaft of the film cartridge, the frictional force is not applied by the actuator plate 42, and, thus, the driving force applied by the rewind fork gear 34 can be effectively transmitted without loss.

On the other hand, the rotation of the motor 1 is also transmitted to the film winding shaft 65 through the driving and rewinding gear trains, so that the winding shaft 65 and the sprocket 85 are driven to rotate in the rewinding direction as indicated by the dotted line arrow (see FIG. 2). The rotation of the winding shaft 65 in the rewinding direction causes the constant torque clutch mechanism 69 to rotate as well as the spool friction mechanism 70; however, since the one-way coupling mechanism 71 is present between the shaft 65 and the spool 79, the rotating power is not transmitted to the spool 79. In other words, as shown in FIG. 15, when the winding shaft 65 rotates in the rewinding direction, the power transmitting projection 77a of the power transmitting washer 77 rotates in the same direction; however, since the one-way pawl 84 pivotally escapes toward inside around the pawl support pin 82a, the rotation of the winding shaft 65 is not transmitted to the spool 79.

Under these circumstances, the rotation of the motor 1 causes the sprocket 85 to rotate thereby advancing the film in the rewinding direction, and, at the same time, the shaft of the film cartridge is driven to rotate by the rewind fork 37 thereby having the film rewound and stored into the cartridge. In this case, the spool 79 rotates by following the motion of the film fed by the sprocket 85. Because of the fact that the one-way coupling mechanism is disposed between the constant rotational speed gear 13 and the set cam 15 (see FIG. 2), the rotation of the gear 13 in the rewinding direction is not transmitted to the setting system of the shutter and quick return mechanism.

Designating the total number of revolutions of the sprocket 85 for feeding the total length of film by $n_1$, the total number of revolutions of the rewind fork 37 by $n_2$ and the ratio between the number of revolutions by $N_1/N_2$, then the gear trains are so structured to satisfy the relation that $N_1/N_2$ is equal to or larger than $n_1/n_2$ in accordance with one embodiment of the present invention. As a result, during the early stage of the film rewinding operation, the feed amount of film per unit time by the sprocket 85 is larger than the winding amount of film per unit time by the rewind fork 37, so that the film is loosely rewound around the cartridge shaft. During the final stage of the rewinding operation when the more film is rewound to the cartridge shaft, since the film feeding amount by the sprocket 85 is exceeded by the take-up amount by the cartridge shaft, the degree of tightness of the film roll around the cartridge shaft is gradually increased. With such structure, at the time of completion of the film feeding by the sprocket, the film rewound into the cartridge is tightly wound around the shaft of the cartridge.

INTERMEDIATE REWINDING OPERATION

This is the mode of operation for carrying out the rewinding operation before reaching the end of film. In this case, the rewind button 76 (see FIG. 2) is depressed to have the clutch switch $SW_K$ turned on.

When the clutch switch $SW_K$ is turned on, the inverter $INV_5$ supplies Hi as its output, which then causes the OR circuit $OR_3$ to supply Hi as its output. Under the condition, since the counter CC supplies Lo as its output and the inverter $INV_6$ supplies Hi as its output, the NAND circuit $NAND_2$ supplies Lo; the NAND circuit $NAND_3$ supplies Hi; the inverter $INV_7$ supplies Lo; and, therefore, the transistor $Tr_2$ is turned on to cause the relay $RL_2$ to be energized thereby causing the motor 1 to be driven to rotate in the rewinding direction. Once the motor 1 has started to rotate in the reverse direction, the remaining rewinding operation is similar to that of the autorewinding operation described above. As described above, the single clutch switch $SW_K$ is shared in two modes of operation: intermediate rewinding mode and automatic rewinding mode.

AUTOREWIND END

The film is competely rewound and stored into the film cartridge by the autorewind (automatic rewinding) operation. At this time, the NAND circuit $NAND_3$ supplies Hi, and pulses are supplied to the counter CC from the pulse generator PG through the AND circuit $AND_6$. Since the film feeding signal switch $SW_S$ is off, the inverter $INV_4$ supplies Lo; on the other hand, since the cartridge detecting switch $SW_F$ is on and the AND circuit $AND_3$ supplies Lo, the OR circuit $OR_2$ supplies Lo. The counter CC counts the number of pulses passed through the AND circuit $AND_6$. The counter CC supplies Hi when a predetermined time period $t_3$ has elapsed upon initiation of counting operation, which then causes the inverter $INV_6$ to supply Lo. Then the NAND circuit $NAND_2$ supplies Hi to have the flipflop FF reset, and the inverter $INV_7$ supplies Hi, so that the transistor $Tr_2$ is turned off to deenergize the relay $RL_2$ thereby temporarily halting the motor 1. With the back cover switch $SW_B$ on, the counter switch $SW_C$ off, the AND circuit $AND_2$ supplying Hi and the OR circuit $OR_1$ supplying Hi, when the inverter $INV_7$ supplies Hi, the NAND circuit $NAND_1$ supplies Lo to render the transistor $Tr_1$ conductive thereby causing the relay $RL_1$ to be energized to drive to rotate the motor 1 in the normal direction. With the motor rotating in the normal direction, the film is wound and the shutter and quick return mechanism is reset to the stand-by position.

When the film counter changes from "S" to "1" due to film winding operation thereby turning the counter switch $SW_C$ on, the AND circuit $AND_2$ supplies Lo and thus the NAND circuit $NAND_1$ supplies Hi thereby causing the transistor $Tr_1$ to be off to deenergize the relay $RL_1$, and, thus, the motor 1 is stopped. On the other hand, when the film counter becomes "S" during film rewinding operation to turn the counter switch $SW_C$ off, the AND circuit $AND_2$ supplies Hi to cause the OR circuit $OR_1$ to supply Hi, so that pulses generated by the pulse generator PG are supplied to the counter CA through the AND circuit $AND_4$. Under this condition, the cartridge detecting switch $SW_F$ is on; the AND circuit $AND_3$ supplies Lo; the film feeding signal switch $SW_S$ is off; and the OR circuit $OR_2$ supplies Lo. Accordingly, the counter CA counts the input pulses and supplies Hi when a predetermined time period has been reached (before the counter switch $SW_C$ turns on). Since the back cover switch $SW_4$ is on, the AND circuit $AND_7$ supplies Hi and the thus the alarm AM warns the end of film rewinding operation. As understood, the system used in "AUTOSTART" and "AUTOLOAD (FAILURE)" is also applied to the alarm system for providing a warning as to the end of film rewinding operation.

In the above-described embodiments, there is a common factor in using an alarm signal. That is, whenever an alarm signal has been generated, the operator is required to open the back cover of the camera.

When the back cover button 60 is pressed down in response to a generated alarm signal, the back cover switch $SW_B$ is turned off thereby stopping the generation of the alarm signal, as shown in FIG. 6. In association with the pressing operation of the back cover button 60, the back cover is opened, and, at the same time, the rewind fork 37 is lowered into and maintained at the stand-by position by means of the actuator rod 44 and plate 42, as shown in FIG. 10.

Then, after removing the cartridge from the cartridge receiving chamber, the power switch $SW_D$ is turned off. In this case, since the rewind fork 37 is maintained at the lowered stand-by position, removal of the cartridge may be carried out with ease.

In accordance with the present invention, the camera may be used without film loaded therein. That is, as far as the photographic operation goes, presence or absence of film in the present camera makes no difference.

As shown in FIG. 17(a), even in the case of absence of film or a film cartridge, with the back cover open, when the release button is depressed to turn the wind end switch $SW_{WI}$ on, the motor 1 is driven to rotate in the normal direction. The conditions for this state are: back cover switch $SW_B$ off; wind end switch $SW_{WI}$ on; and clutch switch $SW_K$ off. When the wind end switch $SW_{WI}$ is turned off, the motor 1 stops its rotation. The conditions for this state are: back cover switch $SW_B$ off; wind end switch $SW_{WI}$ off; and clutch switch $SW_K$ off.

On the other hand, with the back cover closed, the motor 1 will be driven to rotate in the normal direction when the following conditions are met: back cover switch $SW_B$ on; counter switch $SW_C$ off; and clutch switch $SW_K$ off. And, the motor 1 will stop under the following conditions: counter switch $SW_C$ on; wind end switch $SW_{WI}$ off; and clutch switch $SW_K$ off. This is the play mode automatic film loading operation.

When the cartridge detecting switch $SW_F$ is off because of absence of a cartridge in the camera, instead of supplying pulses produced by the film feeding signal switch $SW_S$ (these pulses are produced only when film is actually advanced) to the OR circuit $OR_2$ through the inverter $INV_4$, pulses produced by the pulse generator PG independently from the film feeding operation are supplied to the OR circuit $OR_2$ through the AND circuit $AND_3$, and, therefore, the control operation of the motor 1 together with other operations such as alarm operation and winding and rewinding operations may be carried out irrespective of whether or not film or a film cartridge is loaded in the camera.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A photographic camera for automatically winding a film loaded therein to a spool and rewinding said film from said spool on a frame by frame basis, comprising:
    a driving motor which is driven to rotate in a first direction which corresponds to a winding direction of said film and driven to rotate in a second direction which is opposite to said first direction and corresponds to a rewinding direction of said film;
    first power transmission means having a first end operatively connected to said driving motor for transmitting a driving power received from said driving motor to its second end;
    second power transmission means having a first end operatively connected to said second end of said first power transmission means and a second end connected to a first shaft of said camera, said spool being rotatably mounted on said first shaft;
    third power transmission means having a first end and a second end which is in power transmitting relation with said second end of said first power transmission means and operatively connected to engageable means for engaging a second shaft around which said film is initially wound; and
    first clutch means for operatively connecting said second end of said first power transmission means to said first end of said third power transmission means when said motor is driven to rotate in said second direction and disconnecting said second end of said first power transmission means from said first end of said third power transmission means when said motor is driven to rotate in said first direction.

2. A photographic camera of claim 1 wherein said first clutch means includes a sun gear which is operatively associated with said second end of said first power transmission means and a planet gear supported to be movable around said sun gear over a predetermined angle between first and second positions, said planet gear being operatively coupled to said first end of said third power transmission means when located at said first position and decoupled from said first end of said third power transmission means when located at said second position.

3. A photographic camera of claim 2 wherein said first clutch means further includes a lever which is pivotally supported coaxially with said sun gear for rotatably supporting said planet gear keeping meshed with said sun gear and a pair of stopper pins fixedly provided spaced apart from each other to be engageable with said lever so that said planet gear is located at said first position when said lever is in engagement with one of said stopper pins and at said second position when said lever is in engagement with the other of said stopper pins.

4. A photographic camera of claim 1 wherein said second power transmission means includes second clutch means provided between said first shaft and said spool for having said spool coupled to said first shaft when said motor is driven to rotate in said first direction and having said spool decoupled from said first shaft when said motor is driven to rotate in said second direction.

5. A photographic camera of claim 4 wherein said second clutch means includes a one-way clutch mechanism disposed inside of said spool.

6. A photographic camera of claim 1 wherein said second power transmission means includes friction coupling means provided between said first shaft and said spool.

7. A photographic camera of claim 1 wherein said engageable means includes a rewind fork and means for holding said rewind fork either at a projected position where said rewind fork is in engagement with said second shaft or at a retracted position where said rewind fork is disengaged from said second shaft, said holding means holding said rewind fork at said projected position when said camera is in a rewind mode of operation.

8. A photographic camera of claim 7 wherein said holding means holds said rewind fork at said retracted position when a back cover of said camera is open.

9. A photographic camera for automatically winding the film loaded therein intermittently from a film holding shaft around which said film is originally wound to a spool rotatably supported on a winding shaft and rewinding said film from said spool to said film holding shaft, comprising:

a driving motor which is driven to rotate in a first direction which corresponds to the winding direction of said film and driven to rotate in a second direction which is opposite to said first direction and corresponds to a rewinding direction of said film;

a driving control circuit for controlling a driving condition of said motor;

winding power transmission means for transmitting a power at least to said winding shaft when said motor is driven to rotate in said first direction;

rewinding power transmission means for transmitting a power at least to said film holding shaft when said motor is driven to rotate in said second direction;

detecting means including a constant clutch mechanism provided between said winding shaft and said spool for mechanically detecting a tension of said film when said film is being moved in said winding direction, said detecting means supplying a detection signal to said driving control circuit to cause said motor to be driven in said second direction upon detection of the tension of said film having exceeded a predetermined level.

10. A photographic camera of claim 9 wherein said predetermined level is set slightly lower than the level where damages may be produced to said film.

11. A photographic camera of claim 10 wherein said clutch mechanism includes a first clutch half fixedly mounted on said winding shaft and a second clutch half which is operatively connected to said spool and which is normally coupled to said first clutch half to transmit power to said spool, but decoupled from said first clutch half when the tension of said film has exceeded said predetermined level, and a clutch switch which is operated by said second clutch half when it is decoupled from said first clutch half for supplying said detection signal to said driving control circuit.

12. A photographic camera of claim 11 wherein said first clutch half has a wave-shaped first end face with ridges running radially and said second clutch half has a second end face which is opposed to and shaped in complementary to said end face, said first and second end faces being normally pressed against each other.

13. A photographic camera of claim 11 further comprising a manually operable member for operating said clutch switch when operated manually whereby said detection signal is supplied to said driving control circuit.

14. A photographic camera for automatically winding the film loaded therein intermittently from a film holding shaft around which said film is originally wound to a spool rotatably supported on a winding shaft and rewinding said film from said spool to said film holding shaft, comprising:

a driving motor which is driven to rotate in a first direction which corresponds to the winding direction of said film and driven to rotate in a second direction which is opposite to said first direction and corresponds to the rewinding direction of said film;

a driving control circuit for controlling the driving condition of said motor;

winding power transmission means for transmitting the power at least to said winding shaft when said motor is driven to rotate in said first direction, said winding power transmission means including a sprocket engageable with said film; and rewinding power transmission means for transmitting the power at least to said film holding shaft when said motor is driven to rotate in said second direction, said rewinding power transmission means including a rewind fork engageable with said film holding shaft; whereby, denoting the total number of rotations required for said sprocket to wind up said film over its entire length by $n_1$, the total number of rotations required for said rewind fork to rewind said film over its entire length by $n_2$ and the ratio of the numbers of rotations between said sprocket and said rewind fork by $N_1:N_2$, said winding and rewinding power transmission means are so structured to satisfy the relation of $N_1/N_2$ being equal to or larger than $n_1/n_2$.

15. A photographic camera for automatically winding the film loaded therein from a film holding shaft around which said film is originally wound to a spool rotatably supported on a winding shaft and rewinding said film from said spool to said film holding shaft, comprising:

a driving motor which is driven to rotate in a first direction which corresponds to the winding direction of said film and driven to rotate in a second direction which is opposite to said first direction and corresponds to the rewinding direction of said film;

a driving control circuit for controlling the driving condition of said motor;

winding power transmitting means for transmitting power at least to said winding shaft when said motor is driven to rotate in said first direction;

rewinding power transmission means for transmitting power at least to said film holding shaft when said motor is driven to rotate in said second direction;

means for automatically setting said film so as to locate the first frame of said film at the photographic position of said camera upon closure of the back cover of said camera; and means for detecting the occurrence of failure of automatic setting of said film by said automatic film setting means thereby supplying a stop signal to said driving control circuit to stop the rotation of said motor and at the same time generating an alarm signal to the operator.

16. A photographic camera of claim 15 wherein the generation of said alarm signal is terminated when the back cover of said camera is opened.

17. A photographic camera for automatically winding the film loaded therein from a film holding shaft around which said film is originally wound to a spool rotatably supported on a winding shaft and rewinding said film from said spool to said film holding shaft, comprising:

a driving motor which is driven to rotate in a first direction which corresponds to the winding direction of said film and driven to rotate in a second direction which is opposite to said first direction and corresponds to the rewinding direction of said film;

winding power transmission means for transmitting power at least to said winding shaft when said motor is driven to rotate in said first direction;

rewinding power transmission means for transmitting power at least to said film holding shaft when said motor is driven to rotate in said second direction;

detecting means for detecting the presence or absence of said film in said camera and supplying a signal indicating the presence or absence of said film;

first pulse generating means for generating pulses in association with advancement of said film;

second pulse generating means for generating pulses independently of presence or absence of said film in said camera; and control means for controlling the driving condition of said motor in response to said signal supplied from said detecting means and pulses supplied from said first and second pulse generating means, said control means controlling the driving condition of said motor in response to said pulses supplied from said second pulse generating means when said signal supplied from said detecting means indicates the absence of said film in said camera.

18. A photographic camera of claim 15 further comprising an alarm unit for generating an alarm signal to the operator when a predetermined condition is met, said control means also controlling the operating condition of said alarm unit in response to said signal supplied from said detecting means and pulses supplied from said first and second pulse generating means, said control means controlling the operating condition of said alarm unit in response to said pulses supplied from said second pulse generating means when said signal supplied from said detecting means indicates the absence of said film in said camera.

* * * * *